(12) United States Patent
Bouvier et al.

(10) Patent No.: US 6,773,583 B2
(45) Date of Patent: Aug. 10, 2004

(54) WATER-WETTABLE CHROMATOGRAPHIC MEDIA FOR SOLID PHASE EXTRACTION

(75) Inventors: Edouard S. P. Bouvier, Stow, MA (US); Randy E. Meirowitz, Somerville, MA (US); Patrick D. McDonald, Holliston, MA (US)

(73) Assignee: Waters Investments Ltd., Wilmington, DE (US)

( * ) Notice: Subject to any disclaimer, the term of this patent is extended or adjusted under 35 U.S.C. 154(b) by 0 days.

(21) Appl. No.: 10/615,820

(22) Filed: Jul. 9, 2003

(65) Prior Publication Data

US 2004/0011729 A1 Jan. 22, 2004

Related U.S. Application Data

(62) Division of application No. 10/235,608, filed on Sep. 5, 2002, which is a continuation of application No. 09/874,763, filed on Jun. 5, 2001, now Pat. No. 6,468,422, which is a continuation of application No. 09/643,094, filed on Aug. 21, 2000, now Pat. No. 6,254,780, which is a continuation of application No. 09/374,945, filed on Aug. 16, 1999, now Pat. No. 6,106,721, which is a continuation of application No. 09/216,047, filed on Dec. 18, 1998, now Pat. No. 5,976,367, which is a division of application No. 08/634,710, filed on Apr. 18, 1996, now Pat. No. 5,882,521.

(51) Int. Cl.$^7$ .............................................. B01D 15/08
(52) U.S. Cl. ................................ 210/198.2; 210/502.1; 210/635; 210/656
(58) Field of Search ................................. 210/634, 635, 210/656, 659, 198.2, 502.1; 96/101; 502/402

(56) References Cited

U.S. PATENT DOCUMENTS

| | | | |
|---|---|---|---|
| 3,822,530 A | 7/1974 | Fuller et al. ................... 55/67 |
| 3,878,310 A | 4/1975 | Field et al. ................... 426/422 |
| 3,954,682 A | 5/1976 | Fein et al. ................ 260/2.5 B |
| 4,184,020 A | 1/1980 | Lim et al. ....................... 521/52 |
| 4,297,220 A | 10/1981 | Meitzner et al. ............. 210/690 |
| 4,382,124 A | 5/1983 | Meitzner et al. ............... 521/38 |
| 5,071,565 A | 12/1991 | Fritz et al. .................... 210/692 |
| 5,230,806 A | 7/1993 | Fritz et al. .................... 210/692 |
| 5,278,339 A | 1/1994 | Cook .......................... 562/509 |
| 5,882,521 A | 3/1999 | Bouvier et al. ............. 210/635 |
| 5,976,367 A | 11/1999 | Bouvier et al. .......... 210/198.2 |
| 6,106,721 A | 8/2000 | Bouvier et al. ............. 210/638 |
| 6,254,780 B1 | 7/2001 | Bouvier et al. ............. 210/635 |
| 6,468,422 B2 | 10/2002 | Bouvier et al. .......... 210/198.2 |
| 2003/0042206 A1 | 3/2003 | Bouvier et al. .......... 210/198.2 |

FOREIGN PATENT DOCUMENTS

| EP | 0 021 817 | 1/1981 | .............. 210/198.2 |
|---|---|---|---|
| EP | 0990667 A2 | 4/2000 | .............. 210/198.2 |
| GB | 1 268 875 | 3/1972 | .............. 210/198.2 |

OTHER PUBLICATIONS

Sun, J.J. and Fritz, J.S., "Chemically modified polymeric resins for high–performance liquid chromatography," J. of Chromatography 522:95–105 (1990).

(List continued on next page.)

*Primary Examiner*—Ernest G. Therkorn
(74) *Attorney, Agent, or Firm*—Hamilton, Brook, Smith & Reynolds, P.C.

(57) ABSTRACT

A method for removing an organic solute from a solution comprises contacting the solution with a polymer formed by copolymerizing one or more hydrophobic monomers and one or more hydrophilic monomers, whereby the solute is adsorbed onto the polymer. The solution can comprise a polar solvent such as a polar organic solvent or water or an aqueous buffer. The hydrophobic monomer can be, for example, divinylbenzene. The hydrophilic monomer can be, for example, a heterocyclic monomer, such as a vinylpyridine or N-vinylpyrrolidone.

12 Claims, 1 Drawing Sheet

OTHER PUBLICATIONS

Dumont, P.J. and Fritz, J.S., "Effect of resin sulfonation on the retention of polar organic compounds in solid-phase extraction," J. of Chromatography A 691:123–131 (1995).

Patel, R.M., et al, "Polymeric solid phase extraction of organic acids," American Laboratory 22 (3): 92–99 (Feb. 1990).

"Polymeric Columns for HPLC," Interaction Chromatography, Inc. p. 36 (Abstract) (1993).

"Solid Phase Extraction, Application Guide and Bibliography," eds. McDonald, P.D. and Bouvier, E.S.P., from Waters (Milford, MA) pp. 16–54 (1995).

Snyder, L.R. and Kirkland, J.J., "Introduction to Modern Liquid Chromatography," John Wiley & Sons, Inc. (Second Edition): 281–289 (1979).

Hackh's Chemical Dictionary, Fourth Edition, McGraw–Hill, 1972, p. 327.

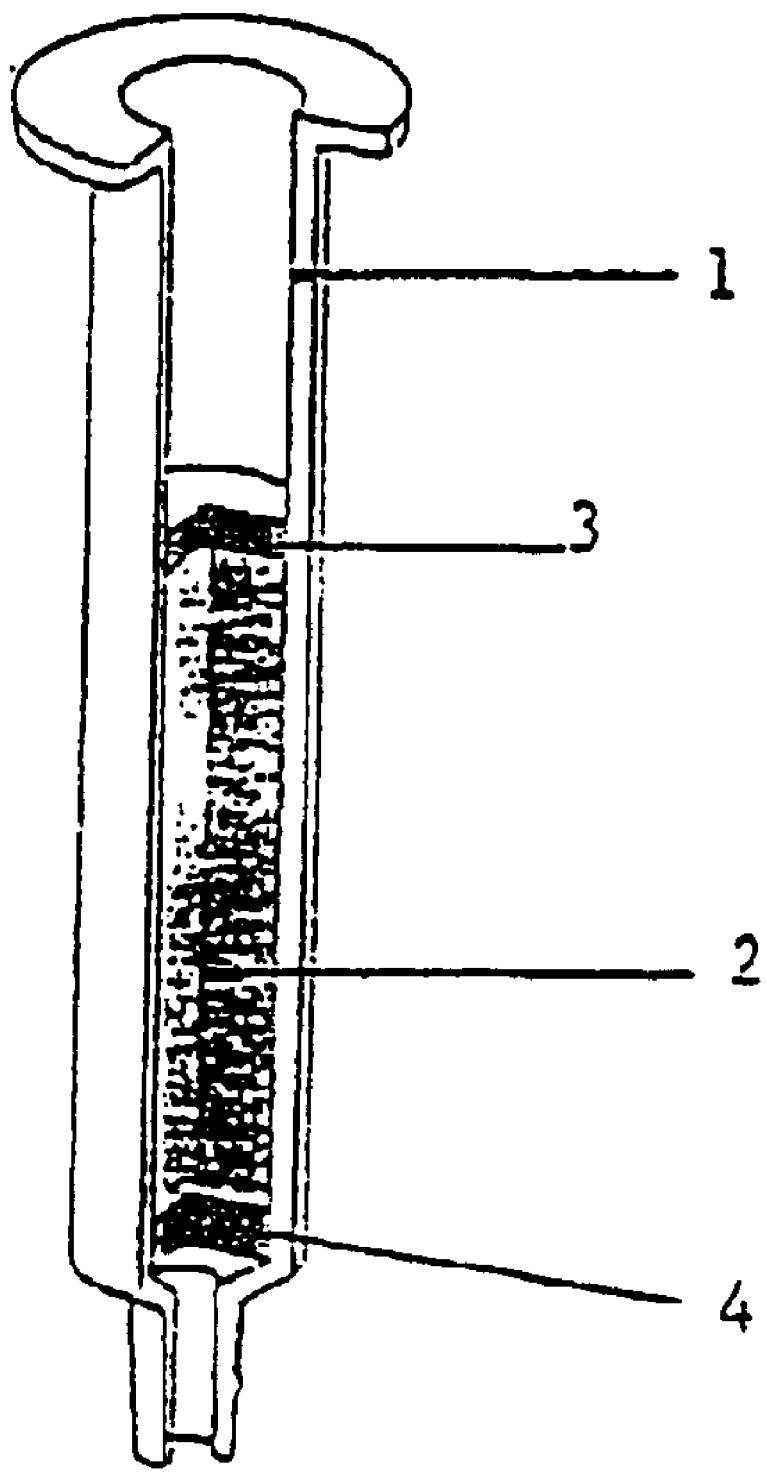

WATER-WETTABLE CHROMATOGRAPHIC MEDIA FOR SOLID PHASE EXTRACTION

RELATED APPLICATIONS

This application is a divisional of U.S. application Ser. No. 10/235,608, filed Sep. 5, 2002 (now allowed), which is a continuation of U.S. application Ser. No. 09/874,763, filed Jun. 5, 2001 (now U.S. Pat. No. 6,468,422; issue date Oct. 22, 2002), which is a continuation of U.S. application Ser. No. 09/643,094 (U.S. Pat. No. 6,254,780; issue date Jul. 3, 2001), filed Aug. 21, 2000, which is a continuation of U.S. application Ser. No. 09/374,945, filed Aug. 16, 1999 (U.S. Pat. No. 6,106,721; issue date Aug. 22, 2000), which is a continuation of U.S. application Ser. No. 09/216,047, filed Dec. 18, 1998 (U.S. Pat. No. 5,976,367; issue date Nov. 2, 1999), which is a divisional of U.S. application Ser. No. 08/634,710 filed Apr. 18, 1996 (U.S. Pat. No. 5,882,521; issue date Mar. 16, 1999). The teachings of each of these referenced applications are expressly incorporated herein by reference in their entirety.

BACKGROUND OF THE INVENTION

Solid phase extraction is a chromatographic technique of frequent use in the preparation of samples for quantitative analysis, for example, via high performance liquid chromatography (HPLC) or gas chromatography (GC) (McDonald and Bouvier, eds. *Solid Phase Extraction Applications Guide and Bibliography*, sixth edition, Milford, Mass.: Waters (1995)). Solid phase extraction can be used to separate a component of interest in a complex solution from potentially interfering matrix elements and to concentrate the analyte to levels amenable to detection and measurement. Thus, solid phase extraction is of use in the analysis of environmental samples, where, for example, various soluble components of soils may interfere with the analysis of trace organic materials. Solid phase extraction is also of importance in the analysis of pharmaceutical agents or metabolites in blood plasma, which requires the prior removal of plasma proteins and other matrix constituents which may interfere with the analysis.

Solid phase extraction of an aqueous solution is typically performed by passing the solution through a single-use cartridge containing a chromatographic sorbent. The most commonly used sorbents consist of porous silica particles that have been functionalized on their surface with hydrophobic octyl ($C_8$) and octadecyl ($C_{18}$) functional groups. Prior to use, such sorbents must be wetted with a water-miscible polar organic solvent to solvate the alkyl chains. This increases the contact of these chains with the aqueous phase, increasing the sorbent surface area available to solutes and, therefore, retention of solutes. Such sorbents which are not pre-wetted or have dried out display poor solute retention, and, thus, inadequate separation of solution components.

The requirement that the sorbent remain wetted during the extraction procedure complicates solid phase extractions and substantially slows sample analysis. For example, solid phase extraction cartridges, in general, have differing flow rates and must be monitored individually to prevent drying out when used on a vacuum manifold, the current state of the art for processing multiple samples. This further complicates the development of instruments for automated solid phase extraction, which often incorporate elaborate safeguards to prevent drying out of the sorbent.

Thus, there is need for a solid phase extraction method which utilizes a sorbent that does not require wetting with an organic solvent or that stays wetted even if the bulk of the wetting solvent is removed during use on a vacuum manifold. Such a method would enable more rapid sample preparation for quantitative analysis, particularly for multiple samples, and allow the development of less expensive and simpler methods for automated solid phase extraction.

SUMMARY OF THE INVENTION

The present invention relates to a method for removing an organic solute from a solution. The method comprises contacting the solution with a water-wettable polymer formed by copolymerizing one or more hydrophobic monomers and one or more hydrophilic monomers, whereby the solute is adsorbed onto the polymer. The solution can comprise a polar solvent such as a polar organic solvent, a water/organic mixture or, preferably, water or an aqueous solution, such as an aqueous buffer, acid, base or salt solution.

The hydrophobic monomer can comprise a hydrophobic moiety. Suitable hydrophobic moieties include, but are not limited to phenyl, phenylene and $C_2$–$C_{18}$-alkyl groups. Suitable hydrophobic monomers include divinylbenzene and styrene.

The hydrophilic monomer can comprise a hydrophilic moiety. In one embodiment the hydrophilic moiety is a saturated, unsaturated or aromatic heterocyclic group, such as a pyrrolidonyl group or a pyridyl group. In another embodiment, the hydrophilic moiety is an ether group. Suitable hydrophilic monomers are, for example, N-vinylpyrrolidone, 2-vinylpyridine, 3-vinylpyridine, 4-vinylpyridine and ethylene oxide.

In one embodiment of the method, the polymer is a poly(divinylbenzene-co-N-vinylpyrrolidone) copolymer which comprises greater than about 12 mole percent N-vinylpyrrolidone. In a preferred embodiment, the copolymer comprises from about 15 mole percent to about 30 mole percent N-vinylpyrrolidone.

The present invention further includes a method for forming a solution, containing a solute, which is suitable for quantitative analysis. In one embodiment, the method comprises contacting a first solution including the solute with a water-wettable polymer formed by copolymerizing at least one hydrophobic monomer and at least one hydrophilic monomer, whereby the solute is adsorbed onto the polymer. This is followed by washing the polymer with a suitable solvent or mixture of solvents, so that the solute is desorbed from the polymer, thereby forming a second solution including the solute. This second solution is suitable for quantitative analysis.

In another embodiment, the invention provides a method for forming a solution comprising a polar organic solute which is suitable for quantitative analysis. The method comprises contacting a solution which includes the polar organic solute and at least one additional solute of lesser polarity with a water-wettable polymer formed by copolymerizing at least one hydrophobic monomer and at least one hydrophilic monomer, whereby the additional solute is adsorbed onto the polymer and the polar solute remains in the aqueous phase. The resulting aqueous phase is, thus, a solution of the polar organic solute which is suitable for quantitative analysis.

The present invention further includes a solid phase extraction cartridge comprising an open-ended container and a polymer packed within the container. The solid phase extraction cartridge can, optionally, further comprise a porous retaining means, such as a frit. The polymer is formed by copolymerizing at least one hydrophobic monomer and at least one hydrophilic monomer. Suitable polymers include poly(divinylbenzene-co-N-vinylpyrrolidone) copolymers which comprise about 12 mole percent or more, preferably from about 15 mole percent to about 30 mole percent, N-vinylpyrrolidone. The solid phase extraction cartridge preferably comprises from about 0.025 g to about 1 g of the polymer.

The present invention enables the solid phase extraction of one or more solutes from an aqueous solution, without prior wetting of the sorbent with an organic solvent. The method is versatile with respect to solute identity, resulting in extraction of a broad range of solutes of varying polarity. A particular advantage of the method is that the sorbent can dry out during the extraction procedure without diminishing the ability of the sorbent polymer to retain solutes. Thus, the present invention provides a simpler method for the preparation of analytical samples, decreasing sample preparation time and increasing sample throughput. The present method is, thus, also more amenable to automation than currently used methods.

BRIEF DESCRIPTION OF THE DRAWING

The FIGURE is a schematic, in cross-section, of one embodiment of the solid phase extraction cartridge of the present invention.

DETAILED DESCRIPTION OF THE INVENTION

The present invention provides a method for solid phase extraction of aqueous or buffered aqueous solutions which does not require that the sorbent be wetted with an excess of organic solvent prior to and during the solid phase extraction process. The invention is based on the discovery that polymers or resins comprising both a hydrophilic monomer and a hydrophobic monomer in a suitable ratio can be wetted by water while maintaining surprisingly effective retention of organic solutes with a wide range of chromatographic polarities.

As described in the Exemplification, a relatively small increase in the N-vinylpyrrolidone content of a poly(divinylbenzene-co-N-vinylpyrrolidone) copolymer resulted in a dramatic improvement in retention of polar organic solutes under conditions in which the pre-wetted polymer was dried under reduced pressure for several minutes. For example, under these conditions, recovery of acetaminophen from such a copolymer comprising 9 mole percent N-vinylpyrrolidone was 10.4%. Increasing the mole percent N-vinylpyrrolidone in the copolymer to 13 resulted in a 92% recovery of acetaminophen. Similar results were observed for procainamide, ranitidine, and caffeine. For relatively nonpolar solutes the difference in recovery between the two copolymers was less dramatic.

The ability of poly(divinylbenzene-co-N-vinylpyrrolidone) copolymers comprising between 13 mole percent and 22 mole percent N-vinylpyrrolidone to retain organic solutes was also compared with that of octadecyl ($C_{18}$)-bonded silica gel. As discussed in the Exemplification, the $C_{18}$-bonded silica sorbent showed poor retention of polar organic solutes when the sorbent was pre-wetted with an organic solvent and then dried under reduced pressure prior to extraction. For example, this sorbent showed a 2.8% recovery of m-toluamide under these conditions. In contrast, the poly(divinylbenzene-co-N-vinylpyrrolidone) copolymer comprising 13 mole percent N-vinylpyrrolidone displayed a 96.3% recovery of m-toluamide under similar conditions.

Overall, the results demonstrate that a balance between the mutually exclusive properties of water-wettability and retention of organic solutes can be achieved in a copolymer which has a suitable ratio of hydrophilic monomers and hydrophobic monomers.

In one embodiment, the invention is a method for removing a solute from a solution. The method comprises the step of contacting the solution with a water-wettable polymer formed by copolymerizing at least one hydrophobic monomer and at least one hydrophilic monomer, whereby the solute is adsorbed onto the polymer. The solution can comprise water, or a mixture of water and a water-miscible polar organic solvent such as methanol, ethanol, N,N-dimethylformamide, dimethylsulfoxide or acetonitrile. The solution can also comprise a mixture of water or an aqueous buffer and a polar, water-miscible organic solvent. In a particularly preferred embodiment, the solution is an acidic, basic or neutral aqueous or predominately aqueous, i.e., greater than about 50% water by volume, solution. The solute is preferably an organic compound.

The solution can be contacted with the polymer in any fashion which permits intimate contact of the polymer and the solution, such as a batch or chromatographic process. For example, the solution can be forced through a porous polymer column, disk or plug, or the solution can be stirred with the polymer, such as in a batch-stirred reactor. The solution can also be added to a polymer-containing well of a microtiter plate. The polymer can take the form of, for example, beads or pellets. The solution is contacted with the polymer for a time period sufficient for the solute of interest to substantially adsorb onto the polymer. This is typically the time necessary for the solute to equilibrate between the polymer surface and the solution. The adsorption or partition of the solute onto the polymer can be partial or complete.

A preferred polymer for use in the present method is water-wettable and has the ability to retain a variety of solutes of varying polarity. The term "water-wettable", as used herein, describes a material which is solvated, partially or completely, by water. The material, thus, engages in energetically favorable or attractive interactions with water molecules. These interactions increase the amount of surface area of the material which, upon contact with water, is accessible to water molecules, and, hence, to solutes present in aqueous solution.

The term "monomer", as used herein, refers to both a molecule comprising one or more polymerizable functional groups prior to polymerization, and a repeating unit of a polymer. A polymer can comprise two or more different monomers, in which case it can also be referred to as a copolymer. The "mole percent" of a given monomer which a copolymer comprises is the mole fraction, expressed as a percent, of the monomer of interest relative to the total moles of the various (two or more) monomers which compose the copolymer.

In one embodiment of the method, the solution is contacted with the polymer in dry form. In another embodiment the polymer is wetted prior to contacting the solution with the polymer, for example, by treating the polymer with a polar organic solvent, followed by water or an aqueous buffer.

The hydrophilic monomer can comprise hydrophilic group. In one embodiment, the hydrophilic group is a heterocyclic group, for example, a saturated, unsaturated or aromatic heterocyclic group. Suitable examples include nitrogen-containing heterocyclic groups such as pyrrolidonyl and pyridyl groups. In another embodiment, the hydrophilic moiety is an ether group. The hydrophilic monomer can be, for example, N-vinylpyrrolidone, 2-vinylpyridine, 3-vinylpyridine, a hydrophobic moiety, 4-vinylpyridine or ethylene oxide.

The hydrophobic monomer can comprise, for example, an aromatic carbocyclic group, such as a phenyl or phenylene group, or an alkyl group, such as a straight chain or branched $C_2$–$C_{18}$-alkyl group. Suitable hydrophobic monomers include, but are not limited to, styrene and divinylbenzene.

In a preferred embodiment, the polymer to be contacted with the solution is a poly(divinylbenzene-co-N-vinylpyrrolidone) copolymer. The polymer can comprise about 12 mole percent or more N-vinylpyrrolidone. In a particularly preferred embodiment, the polymer comprises from about 15 mole percent to about 30 mole percent N-vinylpyrrolidone.

The polymer can be in the form of, for example, beads having a diameter in the range from about 5 to about 500 µm, preferably from about 20 to about 200 µm. The copolymer, preferably, has a specific surface area in the range from about 200 to about 800 square meters per gram and pores having a diameter ranging from about 0.5 nm to about 100 nm.

The solution comprising the solute can, optionally, further contain one or more additional solutes. In one embodiment, the solution is an aqueous solution which includes a complex variety of solutes. Solutions of this type include blood plasma, urine, cerebrospinal fluid, synovial fluid and other biological fluids, including extracts of tissues, such as liver tissue, muscle tissue, brain tissue and heart tissue. Such extracts can be aqueous extracts or organic extracts which have been dried and subsequently reconstituted in water or in a water/organic mixture.

The solution can also be ground water, surface water, drinking water or an aqueous or organic extract of an environmental sample, such as a soil sample. The solution can further be a food substance, such as a fruit or vegetable juice or milk or an aqueous or aqueous/organic extract of a food substance, such as a fruit, vegetable, cereal, or meat.

The solute can be any organic compound of polarity suitable for adsorption onto the polymer. Such solutes can include, for example, drugs, pesticides, herbicides, toxins and environmental pollutants resulting from the combustion of fossil fuels or other industrial activity, such as metal-organic compounds comprising a heavy metal such as mercury, lead or cadmium. The solutes can also be metabolites or degradation products of the foregoing materials. The solutes can also include biomolecules, such as proteins, peptides, hormones, polynucleotides, vitamins, cofactors, metabolites, lipids and carbohydrates.

In one embodiment of the method, the polymer is packed as particles within an open-ended container to form a solid phase extraction cartridge. The container can be, for example, a cylindrical container or column which is open at both ends so that the solution can enter the container through one end, contact the polymer within the container, and exit the container through the other end. The polymer can be packed within the container as small particles, such as beads having a diameter between about 5 µm and about 500 µm, preferably between about 20 µm and about 200 µm. The polymer particles can also be packed in the container enmeshed in a porous membrane.

The container can be formed of any material which is compatible, within the time frame of the extraction process, with the solutions and solvents to be used in the procedure. Such materials include glass and various plastics, such as high density polyethylene and polypropylene. In one embodiment, the container is cylindrical through most of its length and has a narrow tip at one end. One example of such a container is a syringe barrel.

The solid phase extraction cartridge can further comprise a porous retaining means, such as a filter element, or frit, at one or both ends of the cartridge adjacent to the polymer to retain the polymer within the cartridge and to remove undissolved solid materials from the solution as it flows into the cartridge, while still permitting solution flow into and out of the cartridge. Such a filter can be formed from, for example, fritted glass or a porous polymer, such as a porous high density polyethylene.

The amount of polymer within the container is limited by the container volume and can range from about 0.001 g to about 50 g, but is preferably between about 0.025 g and about 1 g. The amount of polymer suitable for a given extraction depends upon the amount of solute to be adsorbed, the available surface area of the polymer and the strength of the interaction between the solute and the polymer. This can be readily determined by one of ordinary skill in the art.

The present invention includes a solid phase extraction cartridge as described above, wherein the polymer is a water-wettable polymer formed by copolymerizing at least one hydrophobic monomer and at least one hydrophilic monomer. The polymer can be, for example, a poly (divinylbenzene-co-N-vinylpyrrolidone) copolymer comprising about 12 mole percent or more N-vinylpyrrolidone. In a preferred embodiment, the copolymer comprises from about 15 mole percent to about 30 mole percent N-vinylpyrrolidone. The cartridge can be a single use cartridge, which is used for the treatment of a single sample and then discarded, or it can be used to treat multiple samples.

A preferred embodiment of the solid phase extraction cartridge of the present invention is illustrated in cross section in the FIGURE. Container 1 is a syringe barrel which can be formed of molded polypropylene and can have a volume ranging from about 1 $cm^3$ to about 50 $cm^3$. Water wettable polymer 2 is prepared by the copolymerization of N-vinylpyrrolidone and divinylbenzene and comprises from about 12 mole percent to about 30 mole percent N-vinylpyrrolidone. Polymer 2 is packed within the container as porous beads of diameter between about 20 µm and about 200 µm. The mass of polymer 2 packed within the container can range from about 0.025 g to about 10 g, depending upon the volume of the container. Frits 3 and 4 are formed of porous high density polyethylene.

The solution to be treated is added to the top of the solid phase extraction cartridge and allowed to flow through the cartridge, bringing the solute to be adsorbed into contact with the polymer. The solution can flow through the cartridge under the force of gravity. Increased flow rates can be achieved by establishing a pressure difference between the ends of the cartridge. Such a pressure difference can be established by attaching a vacuum source to the lower end of the cartridge or by applying positive pressure to the upper end of the cartridge, for example, by applying a pressurized gas, such as air or nitrogen, to the top of the cartridge, or by compressing the air within the cartridge above the polymer with a piston or plunger. The flow rate of the solution through the cartridge can be adjusted by regulating the pressure difference across the cartridge. Suitable solution flow rates, given in terms of the linear velocity of the solution, range up to about 14 mm/second, but are preferably in the range from about 0.7 to about 3.5 mm/second.

Another aspect of the present invention is a method for forming a solution of a solute which is suitable for quantitative analysis. In one embodiment, the solute is of a polarity suitable for adsorption onto the polymer. The method comprises contacting a first solution which includes the solute with a polymer formed by copolymerizing at least one hydrophobic monomer and at least one hydrophilic monomer, whereby the solute is adsorbed onto the polymer. This is followed by washing the polymer with a suitable, stronger solvent or mixture of solvents, thereby desorbing or eluting the solute from the polymer and forming a second solution which contains the solute. This second solution is suitable for the quantitative analysis of the solute.

The solution contacted with the polymer can comprise the solute of interest in dilute form, for example, at a concentration too low for accurate quantitation. By adsorbing the solute onto the polymer and then desorbing the solute with a substantially smaller volume of a less polar solvent, a solution which includes the solute of interest can be prepared having a substantially higher concentration of the solute of interest than that of the original solution. The method also results in solvent exchange, that is, the solute is removed from a first solvent and re-dissolved in a second solvent.

The polymer need not be pretreated or wetted prior to contacting the solution with the polymer. In one embodiment, the polymer is treated with a water-miscible organic solvent, followed by water or aqueous buffer, prior to contacting the solution with the polymer. In another embodiment, the solution is contacted with dry polymer, that is, the polymer is not wetted prior to treatment of the solution.

The solution contacted with the polymer can comprise a polar solvent and is preferably predominately, i.e. greater than 50% by volume, an acidic, basic or neutral aqueous solution or aqueous buffer. The solution can also comprise a water-miscible polar organic solvent such as methanol, ethanol, acetonitrile, N,N-dimethylformamide, or dimethylsulfoxide, or a mixture of such a solvent and water.

The solution comprising the solute of interest can further comprise one or more additional solutes. In one embodiment, the additional solute or solutes are more polar than the solute of interest, and, thus, adsorb more weakly to the polymer than the solute of interest. Such an additional solute can be desorbed from the polymer by washing the polymer with a solvent which does not desorb the compound of interest, thereby forming a solution of the additional solute or solutes which is substantially free of the solute of interest. A suitable solvent for the desorption of the additional solute will typically be sufficiently polar that it does not desorb the compound of interest.

After desorption of the additional solute or solutes, the compound of interest can be desorbed by washing the polymer with a suitable, i.e., less polar, solvent. This forms a solution of the organic solute which is substantially free from more polar solutes and is suitable for the quantitative analysis of the organic solute.

In one embodiment, the solute of interest adsorbs onto the polymer, but one or more additional solutes do not. Such an additional solute can be, for example, of sufficiently high polarity that it does not adsorb onto the polymer. The additional solute can also comprise large molecules, for example, macromolecules such as proteins, which are unable to pass through the pores within the polymer, and, thus, have access to only a small fraction of the overall polymer surface area. Such molecules are typically retained poorly, if at all, by the polymer.

In a further embodiment, the additional solute or solutes are less polar than the solute of interest and, thus, adsorb to the polymer more strongly than the compound of interest. The compound of interest can be weakly to moderately adsorbed or not adsorbed. If adsorbed, the solute of interest is desorbed from the polymer by washing the polymer with a solvent of sufficient polarity that it does not desorb the additional solute or solutes. Thus, the compound of interest can be desorbed from the polymer without desorbing the other solutes.

In one embodiment, the additional solute or solutes are also analytes of interest. Thus a series of solutes initially present in a solution can be separated, and solutions of each suitable for quantitative analysis can be formed using the method of the present invention. In this case, the solution is contacted with the polymer so that the solutes adsorb to the polymer. The solutes are then desorbed from the polymer in order of decreasing polarity (i.e., most polar solute first, followed by solutes of successively decreasing polarity) by washing the polymer with a sequence of solvents of decreasing polarity.

Polymers, solutions and solutes which are suitable for this method include those described above. Solvents which are suitable for desorbing the solute from the polymer will typically be polar water-miscible organic solvents, such as alcohols, for example, methanol, ethanol, and isopropanol, acetonitrile, acetone, and tetrahydrofuran, or mixtures of water and these solvents. The desorbing solvent can also be a nonpolar or moderately polar water-immiscible solvent such as dichloromethane, diethylether, chloroform, or ethylacetate. Mixtures of these solvents are also suitable. Preferred solvents or solvent mixtures must be determined for each individual case. A suitable solvent can be determined by one of ordinary skill in the art without undue experimentation, as is routinely done in chromatographic methods development (McDonald and Bouvier, supra, (1995); Snyder and Kirkland, *Introduction to Modern Liquid Chromatography*, New York: J. Wiley and Sons (1974)).

The methods of the present invention can be used to prepare solutions of a solute which are suitable for quantitative analysis via a variety of techniques, including high performance liquid chromatography, gas chromatography, gas chromatography/mass spectrometry, and immunoassay.

The sorbent polymers used in the methods of the present invention can be prepared via standard synthetic methods. For example, a poly(divinylbenzene-co-N-vinylpyrrolidone) copolymer can be synthesized by copolymerization of divinylbenzene and N-vinylpyrrolidone using standard methods of free radical polymerization which are well known in the art. One method for forming copolymers of this type is disclosed in U.S. Pat. No. 4,382,124, issued to Meitzner et al., the contents of which are incorporated herein by reference. The composition of the resulting copolymer depends upon the starting stoichiometry of the two monomers and can be readily varied. The composition of the product copolymer in some cases will not be substantially the same as the proportion of the starting materials, due to differences in reactivity ratios among the monomers.

The invention will now be further and specifically described by the following example.

Exemplification

Materials

The model solutes procainamide, acetaminophen, m-toluidine, m-toluamide, propranolol, caffeine, and 2,7-dihydroxynaphthalene were obtained from Aldrich Chemical Company (Milwaukee, Wis.), while doxepin, ranitidine, and betamethasone-17-valerate were purchased from Sigma Chemical Company (St. Louis, Mo.). The $tC_{18}$ bonded silica solid phase extraction cartridge was obtained from Waters Corporation (Milford, Mass., catalogue no. WAT054960). A poly(divinylbenzene-co-N-vinylpyrrolidone) copolymer comprising about 9 mole percent N-vinylpyrrolidone was obtained from Waters Corporation (Porapak®R). Poly (divinylbenzene) was also obtained from Waters (Styragel®).

Preparation of poly(divinylbenzene-co-N-vinylpyrrolidone) Copolymers

To a 3000 mL flask was added a solution of 5.0 g hydroxypropylmethylcellulose (Methocel E15, Dow Chemical Co., Midland, Mich.) in 1000 mL water. To this was added a solution of 175 g divinylbenzene (DVB HP-80, Dow), 102 g N-vinyl-2-pyrrolidone (International Specialty Products), and 1.85 g azobisisobutyronitrile (Vazo 64, Dupont Chemical Co, Wilmington, Del.) in 242 g toluene. The resulting biphasic mixture was stirred for 30 minutes at room temperature using sufficient agitation to form oil droplets of the desired micron size. The resulting suspension was then heated under moderate agitation to 70° C. and maintained at this temperature for 20 hours. The suspension was then cooled to room temperature, filtered and washed with methanol. The filter cake was then dried in vacuo for 16 hours at 80° C. The composition of the product polymer was determined by elemental analysis. Elemental analysis: N: 2.24%; mole percent N-vinylpyrrolidone: 20%.

A series of poly(divinylbenzene-co-N-vinylpyrrolidone) copolymers comprising about 13, 14, 16, and 22 mole percent N-vinylpyrrolidone was also prepared by this method by varying the starting ratio of the divinylbenzene and N-vinylpyrrolidone monomers.

A 50 mg amount of each polymer was packed into a 1 cc Sep-Pak Vac® cartridge container (Waters Corporation) having a polyethylene frit at both the inlet and the outlet of the polymer bed to form a solid phase extraction cartridge.

Method

Each model compound was dissolved in 20 mM phosphate buffer, pH 7, to form a solution having a concentration of 10 µg/mL.

Solid Phase Extraction of Model Solutes

The solutions of the model solutes were subjected to solid phase extraction on solid phase extraction cartridges conditioned under two sets of conditions. In both cases the cartridge was attached to a vacuum manifold and treated with 1 mL methanol. The vacuum was set to about 4" Hg, to give a methanol flow rate of 1 mL/minute. Under the first set of conditions ("wet conditions"), the vacuum was released when the methanol level reached the top of the sorbent. Under the second set of conditions ("dry conditions") the sorbent was allowed to dry out under vacuum following conditioning with methanol. As in the first method, the cartridge was treated with 1 mL methanol, at a flow rate, under reduced pressure (4" Hg), of about 1 mL/minute. When the methanol level reached the top of the sorbent, the vacuum was set to 10" Hg and maintained for 10 minutes to dry the polymer bed.

In both wet and dry cases, 1 mL of the model compound solution was applied to the cartridge at a flow rate of 1 mL/minute. A 1 mL portion of 20 mM phosphate buffer, pH 7 was then added at a flow rate of 1 mL/minute. A 1 mL portion of methanol was then added at a flow rate of 1 mL/minute to desorb and elute the model compound. To the eluate was added an internal standard, and the model compound within the eluent was quantitated by high performance liquid chromatography.

Results

The results are summarized in the table below, which lists polar compounds (procainamide, acetaminophen and ranitidine), moderately polar compounds (caffeine, m-toluamide, m-toluidine, 2,7-dihydroxynaphthalene, and propranolol) and nonpolar compounds (dipropylphthalate, doxepin and betamethasone-13-valerate). When the sorbent was poly(divinylbenzene) all compounds except doxepin showed greater than 89% recovery when the sorbent was conditioned under wet conditions. Recovery of doxepin, as shown, was significantly lower because this compound required greater than 1 mL methanol for quantitative elution. When the sorbent was treated under dry conditions, only dipropylphthalate and betamethasone valerate were recovered in greater than 80% yield, and recovery of procainamide, acetaminophen and ranitidine fell below 10%.

When the sorbent was $tC_{18}$-bonded silica, each compound tested was recovered in high yield (>85%) under wet conditions. Allowing the sorbent to dry out had negligible effect on the recovery of dipropylphthalate, doxepin and betamethasone valerate, but reduced the yield of caffeine, m-toluidine, m-toluamide, 2,7-dihydroxynaphthalene and propranolol to about 13% or less.

When the sorbent was a poly(divinylbenzene-co-N-vinylpyrrolidone) copolymer, recovery of each compound was in the range of about 80–100% when the sorbent was kept wetted. When the copolymer composition was 9 mole percent N-vinylpyrrolidone, high recovery of the nonpolar compounds was noted under both wet and dry conditions. The more polar compounds were recovered in high yield under wet conditions but in sharply reduced yield under dry conditions. Recovery of these compounds under dry conditions dramatically increased when the N-vinylpyrrolidone component of the copolymer was increased to about 13 mole percent or greater. The recovery of these compounds under wet conditions was essentially invariant as the copolymer composition was changed.

TABLE

Comparison of SPE recoveries for various model compounds
Analyses performed in triplicate. DVB = divinylbenzene,
NVP = N vinylpyrrolidone-% NVP given as mole percent NVP.

| | Percent Recovery (Average) | | | | | |
| --- | --- | --- | --- | --- | --- | --- |
| | Poly (DVB) | | Poly (DVB-co-NVP) 9% NVP | | Poly (DVB-co-NVP) 13% NVP | |
| Compound | wet | dry | wet | dry | wet | dry |
| Procainamide | 95.4 | 2.5* | 90.8 | 4.9* | | 84.8* |
| Acetaminophen | 98.0 | 2.0* | 93.8* | 10.4* | | 92.3 |
| Ranitidine | 95.0 | 5.4* | 89.6 | 13.4* | | 99.7 |
| Caffeine | 95.6* | 30.8* | 101.0 | 25.6* | 96.0 | 95.7 |
| Toluamide | 98.5 | 54.8* | 101.1 | 74.4* | 96.5 | 96.3 |
| Toluidine | 95.6 | 80.7* | 102.8 | 96.8 | 97.6 | 98.0 |
| 2,7-Dihydroxynaphthalene | 99.5 | 46.5* | 103.6 | 89.6* | 96.8 | 96.3 |
| Propranolol | 92.3 | 55.8* | 102.1 | 94.5 | 94.2 | 92.4 |
| Dipropylphthalate | 91.5 | 99.2 | 102.1 | 101.6 | 93.1 | 100.0 |
| Doxepin | 47.5+ | 55.4+ | 85.3 | 86.8 | 77.5+ | 78.0 |
| Betamethasone-13-valerate | 89.1 | 83.6 | 93.3 | 97.1 | 85.9+ | 89.8 |

TABLE-continued

Comparison of SPE recoveries for various model compounds
Analyses performed in triplicate. DVB = divinylbenzene,
NVP = N vinylpyrrolidone-% NVP given as mole percent NVP.

| | Percent Recovery (Average) | | | | | |
|---|---|---|---|---|---|---|
| | Poly (DVB-co-NVP) 14% NVP | | Poly (DVB-co-NVP) 16% NVP | | Poly (DVB-co-NVP) 20% NVP | |
| Compound | wet | dry | wet | dry | wet | dry |
| Procainamide | 94.2 | 84* | 99.9 | 98.8 | 89.1 | 88.3 |
| Acetaminophen | 97.9 | 89.4* | 104.5 | 104.4 | 96.2 | 94.8 |
| Ranitidine | 93.5 | 88.4 | 98.3 | 97.6 | 86.0 | 85.2 |
| Caffeine | 98.7 | 96.8 | | | 99.7 | 97.3 |
| Toluamide | 100.8 | 96.4 | | | 100.0 | 97.0 |
| Toluidine | 96.5 | 93.4 | | | 94.0 | 93.2 |
| 2,7-Dihydroxnaphthalene | 95.9 | 94.2 | | | 96.7 | 95.4 |
| Propranolol | | | | | 94.1 | 95.4 |
| Dipropylphthalate | | | | | 89.5 | 89.3 |
| Doxepin | | | | | 84.1 | 81.8 |
| Betamethasone-13-valerate | | | | | 92.7 | 87.0 |

| | Percent Recovery Average | | | | | |
|---|---|---|---|---|---|---|
| | Poly (DVB-co-NVP) 20% NVP | | Poly (DVB-co-NVP) 22% N | | tC$_{18}$ | |
| Compound | wet | dry | wet | dry | wet | dry |
| Procainamide | | 92.3 | 85.7 | 93.3 | | |
| Acetaminophen | | 93.4 | 96.7 | 102.2 | | |
| Ranitidine | | 92.1 | 76.9 | 86.6 | | |
| Caffeine | 97.7 | 98.2 | 99.2 | 95.4 | 103.9 | 1.5* |
| Toluamide | 97.0 | 97.3 | 100.5 | 96.3 | 103.7 | 2.8* |
| Toluidine | 95.1 | 96.7 | 91.9 | 90.3 | 101.7 | 13.4* |
| 2,7-Dihydroxynaphthalene | 95.7 | 94.5 | 94.4 | 90.0 | 102.8 | 0* |
| Propranolol | 88.5 | 85.5 | 88.0 | 88.3 | 98.2 | 9.3* |
| Dipropylphthalate | 88.9 | 86.0 | 89.1 | 98.5 | 92.2 | 98.4 |
| Doxepin | 84.7 | 77.5 | 78.6 | 79.9 | 95.1 | 104.0 |
| Betamethasone-13-valerate | 84.0 | 85.0 | 85.9 | 85.9 | 86.6 | 88.3 |

*Breakthrough in load/wash
+Requires greater than 1 mL methanol for complete elution Equivalents Those skilled in the art will recognize or be able to ascertain using no more than routine experimentation many equivalents to the specific embodiments of the invention described herein. Such equivalents are intended to be encompassed in the scope of the following claims.

What is claimed is:

1. A solid phase extraction cartridge comprising a water-wettable polymer packed inside an open-ended container, said polymer being formed by copolymerizing at least one hydrophobic monomer and at least one hydrophilic monomer having a hydrophobic to hydrophilic monomer ratio sufficient for the polymer to be water-wettable while being effective to retain organic solutes thereon and wherein said polymer is capable of adsorbing a less polar solute more strongly than a more polar solute and wherein said solutes are capable of being desorbed from said polymer in order of decreasing polarity by washing said polymer with a sequence of solvents of decreasing polarity.

2. The solid phase extraction cartridge of claim 1 wherein the polymer is a poly(divinylbenzene-co-N-vinylpyrrolidone) copolymer.

3. The solid phase extraction cartridge of claim 1 comprising from 0.001 g to 10 g of copolymer.

4. The solid phase extraction cartridge of claim 3 comprising from 0.025 g to 1 g of copolymer.

5. The solid phase extraction cartridge of claim 1 further comprising one or more porous retaining means adjacent to the polymer.

6. The solid phase extraction cartridge of claim 5 wherein at least one porous retaining means is a filter element.

7. The solid phase extraction cartridge of claim 1 wherein the hydrophilic monomer comprises a heterocyclic group.

8. The solid phase extraction cartridge of claim 7 wherein the heterocyclic group is a pyrrolidonyl group or a pyridyl group.

9. The solid phase extraction cartridge of claim 8 wherein the hydrophilic monomer is selected from the group consisting of 2-vinylpyridine, 3-vinylpyridine and 4-vinylpyridine.

10. The solid phase extraction cartridge of claim 8 wherein the hydrophilic monomer is N-vinylpyrrolidone.

11. The solid phase extraction cartridge of claim 1 wherein the hydrophobic monomer comprises a phenyl group, a phenylene group or a straight chain or branched $C_2$–$C_{18}$ alkyl group.

12. The solid phase extraction cartridge of claim 11 wherein the hydrophobic monomer is styrene or divinylbenzene.

* * * * *